United States Patent [19]

Ing

[11] Patent Number: 4,779,000

[45] Date of Patent: * Oct. 18, 1988

[54] DETECTOR/DOSIMETER FOR GAMMA AND MICROWAVE RADIATION

[75] Inventor: Harry Ing, Deep River, Canada

[73] Assignee: Atomic Energy of Canada Limited, Ottawa, Canada

[*] Notice: The portion of the term of this patent subsequent to Sep. 23, 2003 has been disclaimed.

[21] Appl. No.: 908,778

[22] Filed: Sep. 18, 1986

Related U.S. Application Data

[63] Continuation-in-part of Ser. No. 638,308, Aug. 6, 1984, Pat. No. 4,613,758.

[30] Foreign Application Priority Data

Aug. 26, 1983 [CA] Canada .................................... 435413

[51] Int. Cl.$^4$ ............................ G01T 1/02; G01T 3/00
[52] U.S. Cl. .................................. 250/474.1; 250/390; 250/473.1
[58] Field of Search ............... 250/390 B, 472.1, 473.1, 250/474.1

[56] References Cited

U.S. PATENT DOCUMENTS

| | | | |
|---|---|---|---|
| 4,143,274 | 3/1979 | Apfel | 250/473.1 |
| 4,350,607 | 9/1982 | Apfel | 250/473.1 |
| 4,613,758 | 9/1986 | Ing et al. | 250/474.1 |

Primary Examiner—Carolyn E. Fields
Attorney, Agent, or Firm—Alan A. Thomson

[57] ABSTRACT

A direct reading, self-powered detector and dosimeter for gamma rays, and other low LET radiation, and optionally microwaves, is described. A transparent elastic solid medium contains uniformly dispersed droplets of a very high vapor pressure detector liquid substantially immiscible with the elastic solid. It has been found possible to form stable droplets having a sufficiently high degree of superheat for their vaporization to be sensitive to lightly ionizing radiation such as gamma rays and even to microwave radiation. The droplets can be made stable to spontaneous vaporization, yet their explosive vaporization will be triggered by gamma or in some cases microwave radiation. The solid medium will retain a record of each droplet vaporized, the number being proportional to the dose of radiation. If desired the detector liquid vapors can be condensed or compressed into droplets again and the detector/dosimeter re-used.

16 Claims, 4 Drawing Sheets

DETECTOR/DOSIMETER FOR GAMMA AND MICROWAVE RADIATION

This application is a continuation-in-part of application Ser. No. 638,308 filed 6 Aug. 1984 (U.S. Pat. No. 4,613,758 issued Sept. 23, 1986).

FIELD OF THE INVENTION

This invention is concerned with the detection and dose measurement of radiation, particularly gamma radiation, and other low LET (linear energy transfer) radiation, optionally including microwave. The method of detection exploits the fact that stored energy in the form of superheated discrete droplets of a selected high vapour pressure detector liquid can be released when triggered by gamma or in some cases, microwave radiation. The radiation dose can be determined by counting the number of triggered events, manifested as visible vapor pockets or local fractures or flaws in the selected elastic solid in which the droplets are suspended.

BACKGROUND AND PRIOR ART

There is a need for a radiation detector which can provide an immediate indication of the existance of a low LET radiation field such as gamma rays or of microwaves. The detector should preferably be compact, be sensitive enough to detect radiation levels that are regarded as hazardous to man, give a reading or indication of such a level in an easily interpretable form while the device is being exposed, require no external source of power (such as A.C. supplies or batteries), be reusable so that many measurements can be made on different occasions and have the capability of storing the totality of readings from many measurements within the detector. Such a detector would find application in various areas of work including research, industrial, medical, environmental, military and civil defence. No existing gamma or microwave detector can meet these specifications.

Existing microwave detectors all require external power supplies for their operation and are therefore unsuitable in this context. A brief review of microwave detectors can be found in reference[1].

Although an enormous number of devices have been used for the detection of gamma rays, the bulk of the common gamma ray detectors operate on three basic principles;

(1) they use electrical power to amplify or collect the radiation-induced events in order to make them detectable, e.g. gaseous counters, scintillation counters and semi-conductor detectors[2];

(2) they use radiation-induced change to a substance which is subsequently processed to yield an indication of the radiation exposure, e.g. thermoluminescent dosimeters[3], photographic emulsions[4], detector based on stimulated electron emission[5], silicon diodes[4], and radiation effects on glass[4] or liquid chemicals[6];

(3) radiation induced change in a subtance or device which can be observed directly, e.g. pocket ionization chambers[7], radiochromatic detectors[8] and electrets[9].

Since detectors in category 1 use electrical power, they are unsuitable for the above purposes. Since detectors in category 2 do not give an immediate indication of a radiation field, they need not be considered pertinent. Since gamma ray detectors in category 3 bear some common features with the desired detector, their principles and limitations will be discussed in greater detail.

POCKET IONIZATION CHAMBER

This detector consists of a sealed cylinder e.g. about 10 cm long by 1 cm diameter containing a small ionization chamber as part of the device. The inside wall of the ionization chamber is covered with plastic whose atomic composition approximates human tissue. A tiny fibre is positioned within the chamber so that its exact location is determined by the electric charge residing on the fibre. When the detector is charged, the location of the fibre is farthest away from a reference position corresponding to the uncharged stage. To use the detector, the fibre is initially charged so that the fibre is at the 0 position. When the detector is exposed to radiation, ionization of the gas in the chamber causes a reduction in the total charge of the fibre and, consequently, the fibre moves to a position closer to the reference position giving a positive reading. The extent of the movements can be seen against a scale to give quantitative measures of the radiation exposure. When the fibre reaches the reference position, the detector must be recharged in order to be reused. The limitation of this detector is that it requires electrical power to recharge the detector; the procedure for charging the detector is not simple and requires technical training; no lasting record of the reading is available within the detector; the detector is not very sensitive (cannot detect a few millirems accurately because of minute movements of the fibre); and it is not easy to read the detector during exposure because one must peer into the chamber against a lit background in order to see the fibre.

RADIOCHROMIC DETECTOR

This detector consists of a radiochromic dye, usually in the form of a gel, contained within a thin plastic tubing sealed on both ends with clear epoxy. The index of refraction of the plastic tubing is chosen to be smaller than that of the core material so that the device acts as an optical waveguide. Upon irradiation, the radiochromic dye changes colour and alters the optical properties of the waveguide. The visual appearance of the radiochromic dye after irradiation may be used as a crude indicator of radiation dose. For more accurate dose measurements, the ratios of the transmitted intensities before and after radiation exposure at two different wavelengths of light can be used. The limitation of this detector is mainly inadequate sensitivity. By using the appearance of the radiochromic dye, it is difficult to detect less than 1 rad. The detector is not reusable, although successive exposures are cumulative.

ELECTRETS

Electrets are a di-electric material, such as Teflon TM (polytetrafluorethylene), which can be induced to have a permanent electric charge. This charge is generally a combination of surface charge, space charge and polarization and can be produced by methods such as placing the di-electric material between two electrodes held at a high potential for a certain period of time. The development of polymeric electrets which can maintain a strong electric field and long term stability created by interest[10] in the use of electrets for radiation dosimetry. In this application, the electret is used in a ionization chamber as one or both of the electrodes. The ionization of the gas inside the chamber produces charges which migrate to the electret causing, in effect, an overall reduction of the charge of the electret. Thus, by measuring the charge on the electret before and after the exposure of the chamber to radiation, it is possible to measure the dose received. The limitations of electret dosimeters are that they are still in the developmental stage: current experimental devices do not provide an immediate reading of dose because they use sophisticated methods of readout (e.g. use of a galvanometer) after an exposure, and long term stability (e.g. several months) and quality control of the dosimeters are not yet solved.

In our earlier U.S. patent application Ser. No. 638,308 filed Aug. 6, 1984, Ing et al, we described a direct reading detector/dosimeter for neutrons (and other high LET radiation), in which superheated droplets in a solid medium are caused to vapourize explosively by incident neutrons. The resulting vapour bubbles are visible and leave a record in the form of countable bubbles or damaged sites in the solid medium. This neutron detector has most of the characteristics specified above for a desired gamma/microwave detector but is unable to detect gamma and microwave radiation because of the lower energy density produced in the detector medium by the said radiations. Previously we did not consider it possible to make such a droplet-in-solid medium system sensitive enough to detect gamma and microwave radiation, and, at the same time, be stable enough against spontaneous vapourization to be practical.

DEVELOPMENT OF THE INVENTION

The modifications to the neutron detector of Ing et al that would be required for the proposed gamma/microwave detector are (a) to make such detectors sensitive to gamma rays and to microwaves while being stable against spontaneous nucleation, and (b) to make such detectors reusable while retaining a total record of the readings.

Figure 1:
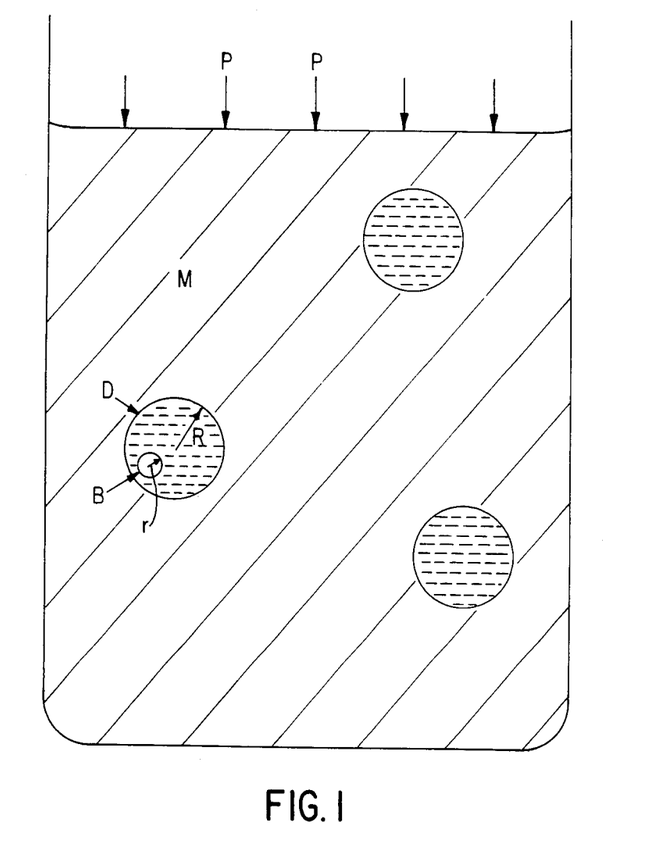
FIG. 1 is a schematic diagram of a magnified detector liquid drople D of radius R in a solid medium M under applied pressure P. Inside the liquid droplet D is shown a small vapour bubble B of radius r, the size of B being much exaggerated.

To make the neutron detector of Ing et al sensitive to gamma rays and/or to microwaves, it is necessary to know how to make the detector more sensitive in terms of reducing the amount of energy density in the medium required to cause the droplets to explode. FIG. 1 shows a schematic diagram of magnified detector liquid droplet of radius R in a solid elastic medium M. Inside the liquid droplet is a small vapour bubble of detector liquid of radius r. If this vapour bubble, formed by radiation, exceed a critical size of radius rc, the vapour bubble will grow and the droplet will "explode". If the bubble is below the critical size, the bubble will shrink under the surface tension of the detector liquid and disappear. In this case, the radiation will not be detected because it did not produce enough energy density to create a large enough vapour bubble. The smaller the critical radius, the less energy-density is required to create the critical bubble and the more sensitive is the detector to lightly ionizing radiation.

The relationship between the critical radius rc and the detector property is given by $$rc = \frac{2\gamma^l}{Pl - P - \frac{2\gamma^{lM}}{R}} \quad (I)$$

where $\gamma^l$ is the surface tension between the detector liquid and its own vapour, $\gamma^{lM}$ is the surface tension between the detector liquid and the detector medium, Pl is the inherent vapour pressure of the detector liquid (which is a strong function of temperature) and P is the applied pressure on the elastic medium. Derivation of this equation follows from the analysis by J. W. Gibbs (Transactions of Connecticut Academy of Arts & Sciences (1878) p. 343). In the earlier detectors developed by Ing et al, the values of $\Delta P = Pl - P$ were in the range of 1.5 atm to 4.0 atm. Such detectors were not sensitive to gamma rays.

In order to make the detectors sensitive to gamma radiation, rc must be made smaller. This is most simply done by increasing Pl, although some other solutions such as choosing a detector liquid with smaller $\gamma^l$ or $\gamma^{lM}$, reducing P, and increasing R would also work in the proper direction.

Now I have found that by judicious selection of detector liquid and degree of superheat and containment thereof, a detector and dosimeter can be formed which will be very sensitive to gamma and optionally to microwave radiation while avoiding any significant spontaneous nucleation and vapourization.

SUMMARY OF THE INVENTION

This invention provides a direct reading detector and dosimeter for gamma and other low LET radiation, and optionally for microwave, comprising;

(a) an elastic solid medium which is sufficiently transparent or translucent to allow detection of discrete bubbles therein, and (b) discrete droplets of a selected high vapour pressure detector liquid dispersed in said solid medium, the droplets having a sufficiently high degree of superheat to vapourize on exposure to gamma radiation and optionally on exposure to microwave or other radiation producing low energy density in the medium, or being under sufficient pressure to cancel this superheat, the degree of superheat being controlled to be below that causing spontaneous vapourization, the solid medium being able to retain the vapours from each droplet at the droplet site.

When in activated form the droplet superheat should be controlled to be within the range of from 4 to about 10 atmospheres for gamma sensitivity and from about 8 to about 10 atm for microwave sensitivity.

The invention includes a method of preparing the detector and dosimeter described herein, comprising:

(a) selecting a high vapour pressure detector liquid, droplets of which can be superheated within the range from 4 to about 10 atm;
(b) forming droplets of the detector liquid in a liquid precursor able to be polymerized or cross-linked into a transparent or translucent elastic solid medium;
(c) polymerizing or cross-linking said precursor to form the solid medium containing entrapped droplets;
(d) optionally when a storage interval is desired, pressurizing the medium to prevent droplet vapourization; and
(e) activating the detector and dosimeter by providing that the droplets are superheated within the range from 4 to about 10 atm.

The method optionally includes a subsequent recharging step, after vapourization of some droplets in use, comprising condensing droplet vapour into droplets and again superheating the droplets to within the range of from 4 to about 10 atm.

Droplets condensed after vapourization in use have been found to be sufficiently larger than the original droplets to permit discrimination thereof e.g. for cumulative dose determination after re-use.

The limit of the degree of superheat attainable is of the order of 12 atmospheres and I have found that in the region from about 10 to about 12 atm the incidence of spontaneous nucleation is too high to give a sensitive and stable detector but that with from 4 to about 10 atm of superheat, good sensitivity and stability can be obtained.

DETAILED DESCRIPTION AND PREFERRED EMBODIMENTS

Figure 3:
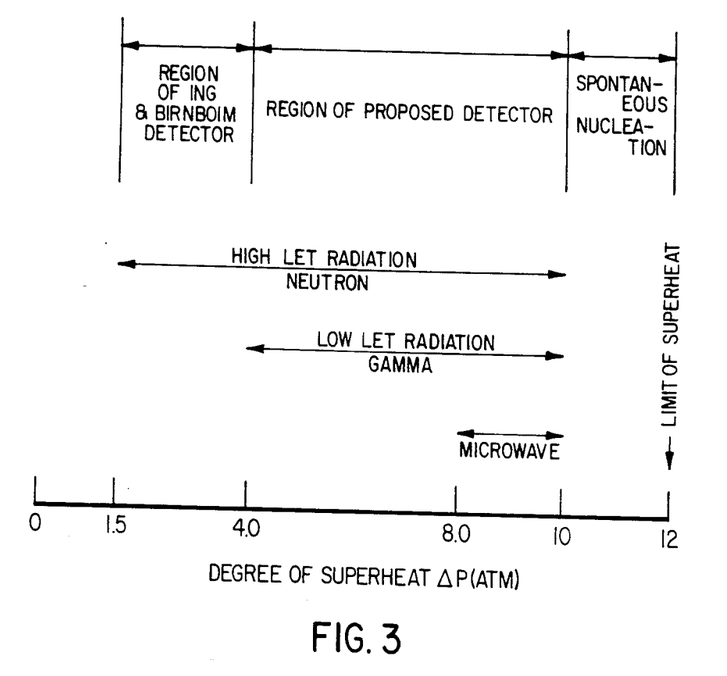
FIG. 3 is a diagram depicting the regions of the degree of superheat of the droplets and the types of radiation which were found to trigger vapourization in these regions.

FIG. 3 illustrates the general detection properties of the herein described detectors to various types of radiation. The numerical values of superheats shown are indicative of the particular type of detector medium, droplet size and detector liquid ($C\,Cl\,F_2\,CF_3$) that were used. If these conditions are changed, the numerical values would vary, but the different regions of detector operations would be similar. In these particular detectors, the superheat region for practical use as a radiation detector spans about 1.5 to 10 atm. Below 1.5 atm, the detector will not detect recoil nuclei such as H, C, O, F and Cl from neutron interactions, although it may be sensitive to heavier elements. Above about 10 atm, the detector becomes increasingly unstable against forming bubbles without being irradiated such that at a superheat of about 12 atm, the detector will form bubbles within minutes after being switched to the radiation sensitive state. Above a superheat of 1.5 atm, the detector will detect neutrons, becoming more and more sensitive to recoil charge particles of decreasing LET from the neutron interactions as $\Delta P$ increases. This range of $\Delta P = 1.5$–4.0 atm was used in the neutron detector of Ing and Birnboim. I have now found that above 4 atm, selected detectors begin to detect gamma rays. As the superheat increases, electrons of lower and lower LET become detectable and, therefore, the sensitivity to gamma rays rises. Sensitivity to micro-waves was found to start at $\Delta P$ of about 8 atm. There appears to be no problem having detectors that are stable enough even for microwave detection.

In addition to gamma and microwave radiation, the droplet-in-elastic solid system can be selected to be sensitive to other radiations which produce low energy density in the medium including beta, muons, UV, and ultrasonic radiation, i.e. any such radiation able to penetrate the solid medium. The degree of superheat is controlled to be above the detection threshold for the radiation to be sensed, i.e. the higher the superheat, the less the energy density required to trigger volatilization.

It has been found that the following criteria are important in selecting the detector liquid:
(i) it must be relatively insoluble in the solid medium (and vice versa), and unreactive therewith;
(ii) it must have a very high vapour pressure in order to provide the high degree of superheat required;
(iii) it must be chemically inert and stable against decomposition at the temperatures and pressures necessary;
(iv) preferably it must boil within the temperature range of about $-100°$ C. to $+100°$ C. and condense within the same range (at atmospheric pressure) to be most effective; and
(v) preferably, be non-toxic.

Suitable detector liquids include volatile hydrocarbons, and halogenated hydrocarbons, particularly volatile fluorinated and/or chlorinated hydrocarbons. Examples include pentafluorochloroethane, octafluorocyclobutane, perfluoropropane and hexafluoroethane.

Mixtures of liquids are very appropriate especially when one component is chosen to comprise hexafluoroethane and another to comprise perfluorobutane.

It has been found that mixtures wherein at least one component is selected from dichlorotetrafluoroethane, dichlorodifluoromethane, hexafluoroethane, perfluorobutane, perfluoropropane, octafluorocyclobutane and pentafluorochloroethane, are preferred in many applications. One mixture found very suitable is a mixture of hexafluoroethane and perfluorobutane in the wt. ratio range from about 20:80 to about 40:60 respectively.

Any elastic substantially transparent or translucent solid medium in which detector liquid droplets can be dispersed, may be used. It is preferable to use a liquid precursor of the solid (such as a liquid monomer or polymer solution which can be polymerized or cross-linked to elastic solid form) as a continuous medium into which the detector liquid can be dispersed or emulsified. The liquid precursor is then polymerized or cross-linked to entrap the dispersed droplets of detector liquid. Vinylic monomers are suitable, e.g. acrylics such as acrylamides and methylmethacrylate, vinyl alcohol, vinylethylcarbitol, vinylpyrrolidone, styrene-divinylbenzene, etc. Solutions of monomers, polymers or mixtures thereof in which the detector liquid is insoluble are preferred, e.g. aqueous solutions of acrylamide plus a bisacrylamide. Solutions of polymers such as dextran or agarose wherein the polymer can be cross-linked in situ to form an elastic solid continuous phase can also be used.

Solvent in the precursor liquid preferably is aqueous but could be selected from other solvents such as alcohols, acetonitrile, dimethylformamide, dimethylsulfoxide and dioxane (when used with an insoluble detector liquid). Boron chloride (liquid) could also be used.

Various polymerization catalysts and cross-linking agents known to the art can be used. These will include ammonium persulfate, radiation to which the detector liquid is insensitive, peroxide, ethylenediacrylate, riboflavin + light, tetramethylethylenediamine, etc.

The amount of the discrete droplets may be varied over a wide range to suit the particular application. Normally the amount of the droplets will be within the range of about 0.02 to about 30% by vol. The droplet size is not critical but usually will be within the range of about 0.1 to about 150 microns diameter. For gamma or microwave radiation it has been found that the optimum size will depend on the incident radiation: usually this optimum will be within the range of about 1 to about 100 microns preferably 10 microns.

The following is an example of one approach to preparing the gamma detector. Aqueous solutions of water-soluble monomers and heavy solutes can be caused to polymerize by addition of suitable catalysts to form a firm elastic medium. Prior to polymerization, the detector liquid is added. Because the detector liquid has a low boiling point, the monomer solution is cooled sufficiently to delay polymerization and also to allow addition of the detector liquid at ambient pressure. The screw-cap glass tube (or other suitable container) containing these agents is sealed and warmed slightly, preferably with vigorous vortex mixing. As the aqueous solution warms or melts, the water-insoluble detector liquid is blended in to form a fairly uniform suspension of droplets. These droplets in many cases would settle out if the density of the aqueous solution were not closely matched to the density of the detector liquid, e.g. by prior addition of heavy solutes, preferably a cesium salt. Excess detector liquid is then added at a temperature below its boiling point without further mixing. After sealing the container and standing at about 15° C. for about 5–10 mins, the resultant detector is a firm, elastic, translucent medium, polymerized in situ, which is stable for at least seven weeks. It is activated (made sensitive to radiation) by pouring off excess detector liquid which decreases the internal pressure and causes superheating of the detector droplets.

In preparing the detector or dosimeter, we have found that after the detector liquid is added, it is not necessary to mix actively the detector liquid as droplets throughout the liquid precursor: sufficient dispersion takes place passively from an overlay of detector liquid so that droplets are formed in situ. Detectors formed by this simpler procedure have lower sensitivity but are useful in some applications.

The detector/dosimeter may be used with or without appropriate containing means. Normally a container which can be pressurized will be used to increase storage life and the pressure released to activate the system.

Irradiation by gamma or microwave causes volatilization of the droplets and the rapid formation of small bubbles within the host detector medium which cause local deformation. The bubbles remain at their sites and can be counted visually or by other means. Deformation sites can also be used as a method of dosimeter reading. The use of these firm, elastic, radiation-penetrable, translucent hosts (polyacrylamide is an example) has many advantages over the prior art. For instance these systems:

(1) are firm, elastic, stable, non-biodegradable and can readily be prepared in containers or moulds of any suitable shape,
(2) allow wide flexibility in the preparation of host detection media with different strengths and elastic properties,
(3) can be assembled at low temperatures, even in the frozen state, in sealed or unsealed vessels, then uniformly dispersed and allowed to set in situ,
(4) allow the addition of other ingredients such as metal salts to give desirable characteristics to the radiation response,
(5) are translucent and allow the number of bubbles resulting from the interactions to be used as a measure of radiation fluence or dose,
(6) are firm yet elastic and confine the bubbles even for long periods of time under appropriate conditions, e.g. under an overlay of heavy liquid. Softer media would allow bubbles to migrate and coalesce destroying a linear relationship between bubble number and radiation dose,
(7) in the firmer solid media, local, fractural damage leaves an essentially permanent record of dose reading, such damage being the result of volatilization of droplets causing surrounding host material to be distorted beyond its elastic limit,
(8) after preparation they can be removed from the container and cut into any suitable configuration for use. Softer media (non-solid) require special containers to support the host medium and the container is an inseparable part of any detector using such media.

In the less firm, more elastic solid media, the gas bubbles formed after radiation exposure are more stable than in the firmer media. Bubble stability could be extended e.g. to 3–4 months, by overlaying with one or more layers of liquid such as a concentrated metal salt (e.g. cesium chloride) solution, liquid mercury or a highly volatile liquid such as Freon 114 (dichlorodifluoromethane). When these overlayers are present increased post-exposure stability and prolonged readability result. In cases where the bubbles apparently had collapsed or disappeared, it was found they could be caused to re-appear throughout the solid medium by reducing the external pressure.

These overlay liquids may be concentrated solutions of metal salts such as cesium chloride, cesium carbonate, cesium formate, rubidium bromide and lithium bromide, or mercury (liquid). These salts may also serve as heavy solutes in adjusting the density of precursor during the preparation.

RECHARGING AND CUMULATIVE DOSE DETERMINATION

In order to make the detector reusable and to be able to retain information from each exposure, it is necessary to make the medium elastic enough so that the bubble from the droplet explosion does not stretch the medium beyond its elastic limit. In this case, no permanent damage of the medium is caused by the explosion and the bubble can be recompressed into a droplet at any convenient time after a radiation exposure by the use of high pressure. However, immediately after a droplet explosion, it has been observed that the bubble grows rapidly because the bubble is fed by dissolved detector liquid always present in the detector medium. Thus when the bubble is recompressed, the resulting droplet is noticeably larger than the initial virgin droplet (because of the added gas) and can be easily identified as a droplet which had already exploded. Since there are numerous droplets in each detector, the effect of having a tiny fraction of its droplets increased in size, has negligible effect on the overall detection efficiency of the detector on recompression and re-use. Thus such a detector can be used, recompressed and be reused many times. At the same time, the totality of all the bubbles produced is recorded cumulatively in the detector in the form of enlarged droplets.

The cumulative dose can be determined by counting the totality of enlarged droplets byvisual or other means.

The following examples are illustrative.

EXAMPLE 1

Reagents

A. Acrylamide Solution

Acrylamide (50 g), methylenebisacrylamide (3.7 g) and 12.5 g of 1M sodium phosphate buffer (pH 6.8) were dissolved in double distilled water (final volume was 250 ml). The solution was clarified by passage through a 0.45 micron membrane filter.

C. Saturated Cesium Chloride Solution 50 g of CsCl were added to 25 ml of double distilled water. They were mixed and left to stand at room temperature for at least 30 min.

D. Detector Liquid

Pentafluorochloroethane was collected and held in a test tube prechilled in a dry ice/ethanol bath.

P. Ammonium persulfate

A 10% solution (w/v) was prepared weekly and stored at 4° C.

Preparation of Detector

Solutions A and C were mixed in proportions to match the density of the detector liquid D. Appropriate volumes were determined by trial and error by mixing A and C in different ratios, and adding these mixtures to a screw cap test tube along with a small volume of D. Proper precautions were taken against explosion if a high vapour pressure was expected from mixing. The appropriate ratio of A and C in the mixture is one in which D hovers and neither sinks nor floats. 2 ml of the mixture was then transferred to a 13×100 mm screw cap test tube and 0.02 ml of solution P added.

The contents of the test tube were then outgassed using a water aspirator as a vacuum source. 0.02 ml of tetramethylenediamine (TEMED) were then added and mixed thoroughly but gently to avoid re-aeration of the sample. The contents of the tube were then frozen in a dry ice/ethanol bath.

The desired volume of D was then added to the tube and the cap secured. For a volume of A and C of 2 ml, the volume of D was usually arranged to be about 0.1 ml.

The contents of the tube were warmed in a water bath at room temperature until the contents were partially thawed. The contents were then vortexed vigorously as they thawed to obtain a substantially uniform dispersion of D as fine droplets. The contents were then frozen again in the dry ice/ethanol bath.

The tube was then uncapped and 0.7 ml of D was added. The cap was then resecured. The tube and contents were handled gently to avoid any shaking.

The tube and contents were transferred to a water bath 15° C. to allow the contents to thaw and polymerization to occur. Polymerization was visible after 5–10 minutes and was complete by 60 minutes. The detector is stable as long as excess D remains. The detector is activated by uncapping the tube, pouring off D and either recapping immediately or after the addition of another liquid having a lower vapour pressure.

EXAMPLE 2

Figure 2:
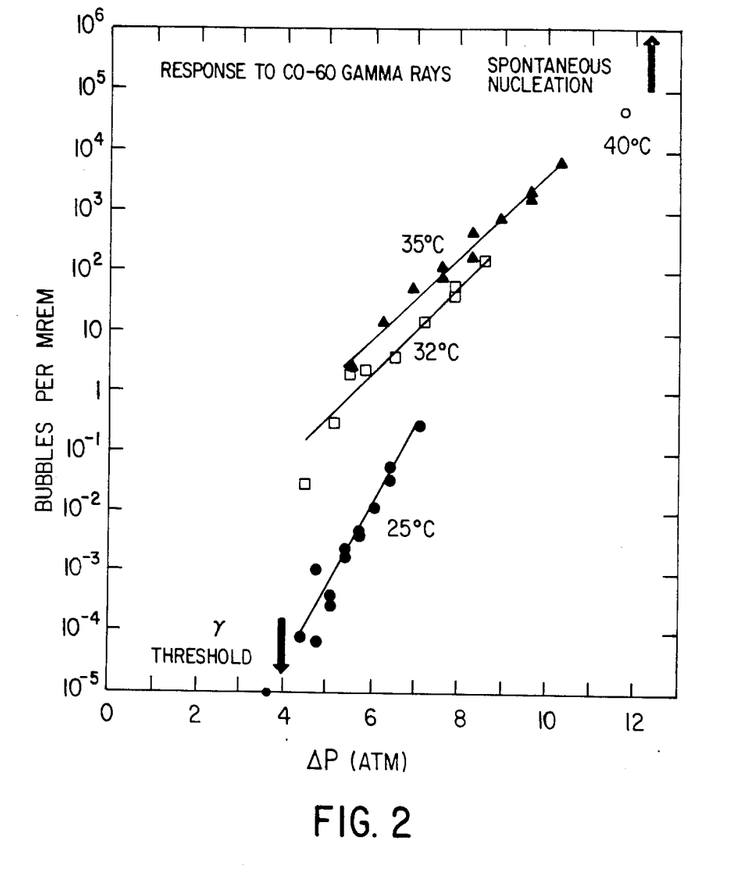
FIG. 2 is a graph showing the degree of superheat of the detector liquid droplets (abscissa) and their sensitivity to Co-60 gamma rays (ordinate) at four temperatures. The gamma detection threshold and the spontaneous nucleation commencement are indicated.

FIG. 2 shows the results of an experiment to demonstrate the detector's ability to detect radiation of decreasing LET (i.e. lightly ionizing particles) as $\Delta P = Pl - P$ is increased. In this experiment, we have embedded droplets of very high pressure detector liquid ($CClF_2CF_3$) in a polyacrylamide polymer medium as described above. The pressure of the detector liquid Pl was varied by controlling the temperature in the detector and P (the applied pressure on the elastic medium) was varied by applying different pressures of nitrogen on the detector. The results show that for this type of detector, ability to detect $^{60}Co$ gamma rays starts at $\Delta P$ of about 4 atm. For $\Delta P$ of about the 12 atm, this type of detector undergoes spontaneous nucleation because the normal thermal motion of molecules provides sufficient energy to cause the droplets to explode. The 3 curves shown in FIG. 2 were obtained by varying P while the detector was kept at three different temperatures (25°, 32° and 35° C.). The reason that the curves do not join smoothly is because of the term $$\frac{2\gamma^{lM}}{R}$$

[ref. eq. (1)] which depends on the temperature of the detector. The sensitivity is given in terms of the number of bubbles in the detector after exposure to 1 mrem of $^{60}Co$ gamma rays (along the ordinate in FIG. 2). These results also provide evidence that it is possible to make practical, stable detectors using superheated liquid droplets in an elastic medium such that gamma rays can be detected with an enormous range of sensitivities.

EXAMPLE 3

The detector was prepared as described in Example 1. The detector was exposed to 15 mW/cm² of microwave radiation with the detector at room temperature of approximately 21° C. At this temperature, the degree of superheat was approximately 7 atmospheres. No bubbles were observed after 10 minutes of exposure to the microwave radiation. When this detector was warmed to a temperature of 33° C. ($\Delta P = 9$ atmospheres) and exposed to 14 mW/cm² of microwave radiation a large number of droplets were vapourized into bubbles (about 25% of droplets present). This detector was in a glass tube and the lower part of the tube was shielded from the radiation. A sharp line of demarcation was observed between the irradiated and non-irradiated parts of the detector with the lower part being free of bubbles, which showed that the induced nucleation was from microwave interaction with the droplets as opposed to nucleation resulting from bulk heating of the medium.

EXAMPLE 4

Figure 4:
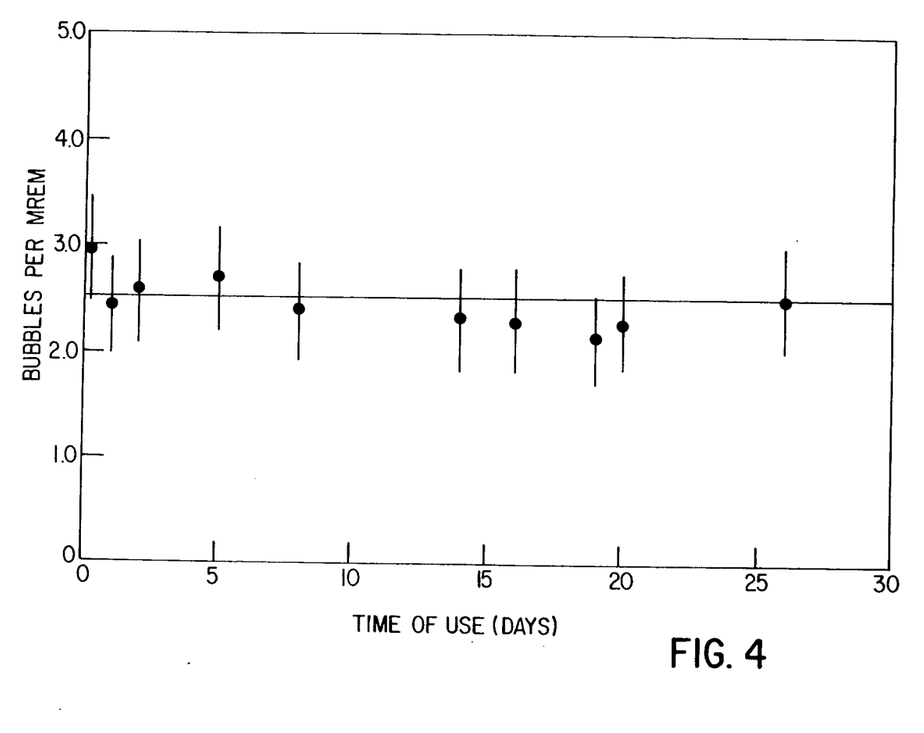
FIG. 4 is a graph for variation of sensitivity of the detector (in bubbles vapourized per MREM of radiation) over time in use (in days). The central dot indicates the average for 5 detector samples and the vertical line the range of the 5 readings.

FIG. 4 shows the results for five detectors (prepared as in Example 1) which were exposed to a known radiation field (including gamma) for an eight-hour working day, recompressed and reused the following day. These detectors were cycled in this manner for several weeks. The results showed that the detection sensitivity remained substantially unchanged over this period, proving that such detectors are reusable.

These detectors will be stable for up to about 48 hours after activation. The stability can be extended by recompressing the detector every 24 hours. I have recharged and re-used the same detectors as many as 20 times without serious loss of sensitivity.

The detectors and dosimeters described herein are intended to permit both qualitative and quantitative measurements of gamma and at the higher levels of droplet superheat, microwave radiation: they will detect the presence of such radiation and give a direct indication thereof, and also give a measure of dose when the number of bubbles is counted e.g. by a video projection type counter.

The device may be used in the form of film for radiography, or in the form of coins, cylinders or blocks for application as detectors or dosimeters in particular situations.

It is possible to use an array of three separate films or blocks in the one detector and dosimeter each having a different droplet superheat level chosen within the ranges 1.5–4 atm, 4–8 atm and 8–10 atm such that neutron, gamma and microwave are detected concurrently (See FIG. 3). These devices are most advantageous in situations where a high degree of portability and freedom from external power sources are required.

BIBLIOGRAPHY

Reference No.
1. World Health Organization, *Environmental Health Criteria* 16, *Radiofrequency and Microwaves* (World Health Organization, Geneva, 1981) p. 40–42.
2. E. Fenyves and O. Haiman, *The Physical Principles of Nuclear Radiation Measurements* (Academic Press, New York, 1969) chapter 4.
3. A. F. McKinlay, *Thermoluminescence Dosimetry* (Adam Hilger Ltd. 1981).
4. K. Becker, Solid State Dosimetry (CRC Press, Cleveland, Ohio, 1973) chapter 6.
5. G. Portal, A. Scharmann and G. Swindell, *Exoelectron Emission and Its Applications,* Rad. Prot. Dos. 4. (Nucl. Tech. Put, Ashford, England, 1983).
6. National Bureau of Standards, "Measurement of Absorbed Dose of Neutrons, and of Mixtures of Neutrons and Gamma Rays" National Bureau of Standards Handbook 75 (1961) 42–46.
7. H. Francois, E. D. Gupton, R. Maushart, E. Piesch, S. Somasundaram and Z. Spurny, *Personnel Dosimetry Systems for External Radiation Exposures,* IAEA Technical Report 109 (IAEA, Vienna, 1970) p. 94–102.
8. S. Kronenberg, W. McLaughlin and C. R. Siebentritt, "Broad-Range Dosimetry With Leuko Dye Optical Waveguides" Nucl. Inst. Meth. 190 (1981) p. 365–368.
9. B. Gross, in "Tropics in Applied Physics": Electrets, Vol. 33 (ed. G. M. Sessler) (Berlin: Springer Verlag).
10. H. Bauser and W. Ronge, "The Electret Ionization Chamber: A Dosimeter for Long Term Personnel Monitoring." Health Physics, 34 (1978) 97–102.

What is claimed is:

1. A direct reading detector and dosimeter for gamma and other low LET radiation, and when selected, for microwave, comprising:
    (a) an elastic solid medium which is sufficiently transparent or translucent to allow detection of discrete bubbles therein, and
    (b) discrete droplets of a selected high vapour pressure detector liquid dispersed in said solid medium, the droplets having a sufficiently high degree of superheat to vapourize on exposure to gamma radiation or to microwave or other radiation producing low energy density in the medium, or being under sufficient pressure to cancel this superheat, the degree of supeheat being below that causing spontaneous vapourization, the solid medium being able to retain the vapours from each droplet at the droplet site.
2. The detector and dosimeter of claim 1 in activated form wherein the droplet degree of superheat is within the range of from 4 to about 10 atmospheres for gamma sensitivity and from about 8 to 10 atm. for microwave sensitivity.
3. The detector and dosimeter of claim 1 in inactive form under pressure sufficient to prevent vapourization of the detector liquid.
4. The detector and dosimeter of claim 1, wherein the detector liquid is selected from pentafluorochloroethane, octafluorocyclobutane, perfluoropropane and hexafluoroethane.
5. The detector and dosimeter of claim 1, the detector liquid being a mixture including at least one component selected from dichlorotetrafluoroethane, dichlorodifluoromethane, hexafluoroethane, perfluorobutane, perfluoropropane, octafluorocyclobutane and pentafluorochloroethane.
6. The detector and dosimeter of claim 5 wherein the detector liquid is a mixture of hexafluoroethane and perfluorobutane in the wt. ratio range from about 20:80 to about 40:60 respectively.
7. The detector and dosimeter of claim 1 wherein the solid medium is a polymer formed from selected acrylic or vinylic monomers.
8. The detector and dosimeter of claim 1 wherein the solid medium is a copolymer of acrylamide and bisacrylamide.
9. The detector and dosimeter of claim 1 wherein the solid medium is a selected polymer in cross-linked form.
10. The detector and dosimeter of claim 1 wherein the droplets are present in from about 0.02 to 30% by volume.
11. The detector and dosimeter of claim 1 wherein the droplet size ranges from about 0.1 to about 150 microns diameter.
12. The detector and dosimeter of claim 1 wherein the size of some portion of the droplets is larger than the size of the remainder of the droplets.
13. The detector and dosimeter of claim 2 wherein the droplet degree of superheat is from about 8 to 10 atm. wherein the system is sensitive to microwave as well as gamma and neutron radiation.
14. A method of preparing a radiation detector and dosimeter comprising
    (a) selecting a high vapour pressure detector liquid, droplets of which can be superheated to within the range from 4 to about 10 atm;
    (b) forming droplets of the detector liquid in a liquid precursor able to be polymerized or cross-linked into a transparent or translucent elastic solid medium;
    (c) polymerizing or cross-linking said precursor to form the solid medium containing entrapped droplets;
    (d) optionally when a storage interval is desired, pressurizing the medium to prevent droplet vapourization; and
    (e) activating the detector and dosimeter by providing that the droplets are superheated to within the range of from 4 to about 10 atm.
15. The method of claim 14 including a subsequent recharging step, after vapourization of some droplets in use, comprising condensing droplet vapour into droplets and again superheating the droplets to within the range of from 4 to about 10 atm.
16. The method of claim 15 wherein the condensed droplet is sufficiently larger than the original droplet to permit discrimination thereof and a cumulative dose determination is made.

* * * * *